(12) United States Patent
McGuffie

(10) Patent No.: US 9,833,688 B2
(45) Date of Patent: Dec. 5, 2017

(54) LINE MARKING APPARATUS WITH DISTANCE MEASUREMENT

(71) Applicant: DIGITAL LINE MARKERS FZE, Sharjah (AE)

(72) Inventor: Iain Peter McGuffie, Nr. Bromyard (GB)

(73) Assignee: FLEET US LLC, Dakota City, NE (US)

( * ) Notice: Subject to any disclaimer, the term of this patent is extended or adjusted under 35 U.S.C. 154(b) by 0 days.

(21) Appl. No.: 14/392,008

(22) PCT Filed: Jul. 15, 2013

(86) PCT No.: PCT/IB2013/055808
§ 371 (c)(1),
(2) Date: Jan. 13, 2015

(87) PCT Pub. No.: WO2014/013414
PCT Pub. Date: Jan. 23, 2014

(65) Prior Publication Data
US 2015/0375091 A1    Dec. 31, 2015

(30) Foreign Application Priority Data
Jul. 16, 2012   (GB) .................................. 1212615.7

(51) Int. Cl.
*E01C 23/00*   (2006.01)
*A63C 19/06*   (2006.01)
*G01S 19/07*   (2010.01)

(52) U.S. Cl.
CPC ............ *A63C 19/065* (2013.01); *G01S 19/07* (2013.01); *A63C 2019/067* (2013.01)

(58) Field of Classification Search
CPC .. A63C 19/065; A63C 2019/067; G01S 19/07
USPC ........................................ 404/84.05, 94, 111
See application file for complete search history.

(56) References Cited

U.S. PATENT DOCUMENTS

| | | | |
|---|---|---|---|
| 2,803,382 A | 8/1957 | Montminy | |
| 2,833,542 A * | 5/1958 | Martin | E01C 23/166 222/370 |
| 5,333,966 A * | 8/1994 | St-Louis | E01C 23/163 404/84.05 |
| 5,368,232 A | 11/1994 | Schroeder | |
| 5,540,518 A * | 7/1996 | Wambold | E01C 23/222 404/84.05 |
| 5,599,133 A * | 2/1997 | Costello | E01C 23/14 404/72 |
| 5,718,534 A * | 2/1998 | Neuling | B60K 17/043 180/11 |
| 5,951,201 A * | 9/1999 | Jones | E01C 23/166 239/150 |

(Continued)

FOREIGN PATENT DOCUMENTS

| | | |
|---|---|---|
| DE | 4013950 A1 | 11/1991 |
| GB | 2180282 A | 10/1957 |

*Primary Examiner* — Raymond W Addie
(74) *Attorney, Agent, or Firm* — Timothy Marc Shropshire; Eric Brandon Lovell; Garrett James O'Sullivan

(57) ABSTRACT

A line marking apparatus comprises a body (21) mounted so as to be mobile, a line marking head (29) movable relative to the body, and means (35, 37, 41, 43) for determining the distance travelled by the apparatus from a determined point.

18 Claims, 2 Drawing Sheets

(56) References Cited

U.S. PATENT DOCUMENTS

Figure 1:
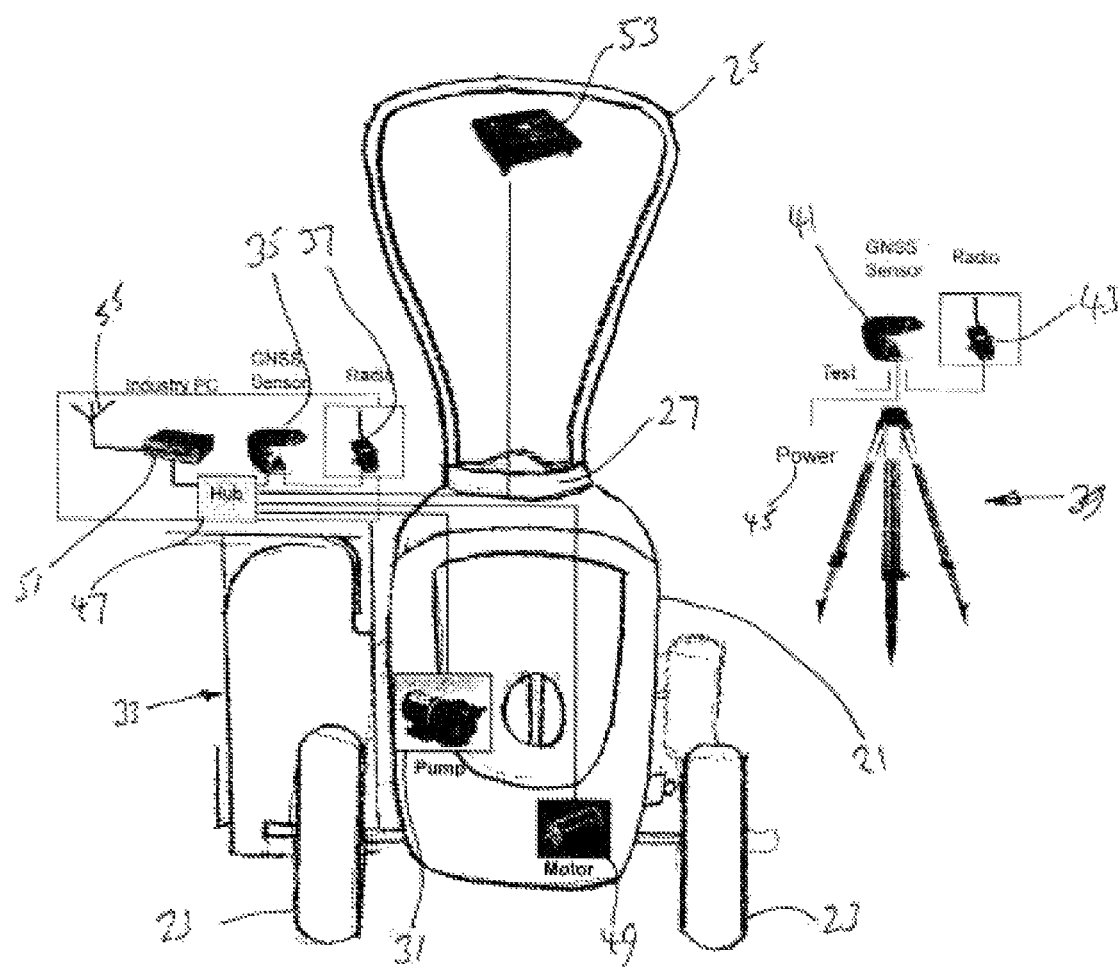

| | | | |
|---|---|---|---|
| 6,206,610 B1* | 3/2001 | Neuling | B62D 33/0625 |
| | | | 345/8 |
| 6,213,680 B1* | 4/2001 | Schaeffer | B28C 9/04 |
| | | | 404/107 |
| 7,850,101 B2* | 12/2010 | Walmer | E01C 23/22 |
| | | | 239/150 |
| 8,021,077 B2* | 9/2011 | Annese | E01C 19/004 |
| | | | 118/305 |
| 2007/0059098 A1 | 3/2007 | Mayfield et al. | |
| 2008/0256817 A1 | 10/2008 | Watkins | |
| 2009/0202298 A1* | 8/2009 | Bjorklund | E01C 23/166 |
| | | | 404/77 |
| 2009/0233623 A1* | 9/2009 | Johnson | H04W 4/02 |
| | | | 455/456.3 |
| 2010/0266756 A1 | 10/2010 | Knutson et al. | |
| 2012/0203475 A1* | 8/2012 | Wilkens | B05B 9/06 |
| | | | 702/47 |
| 2015/0132059 A1* | 5/2015 | Johnson | E01C 23/0946 |
| | | | 404/84.05 |
| 2015/0330039 A1* | 11/2015 | Vanneman | E01C 23/163 |
| | | | 404/94 |

* cited by examiner

LINE MARKING APPARATUS WITH DISTANCE MEASUREMENT

This invention relates to a line marking apparatus incorporating distance measurement and to the use of such apparatus.

It is known to use a geographical positioning system, such as differential GPS, IMU (inertial measurement unit) or a laser-based system to position a line marking head of a line marking apparatus in a desired geographical location for marking a portion of a line, such as a straight line or a curved line.

The line marking head may be mounted on a carriage so as to be laterally displaceable. In this way, minor errors of direction can be corrected by movement of the line marking head laterally along the carriage, while an operator or automatic control system can react to lateral movement of the line marking head and adjust the direction of the line marking apparatus to bring the line marking head back towards a median position midway between the lateral ends of the carriage.

When marking lines, for example on a sports pitch, athletics track or car park, distance measurement is effected with a tape or trundle wheel. The problems associated with these known measuring devices is that they are insufficiently accurate and take time to implement. For example, a trundle wheel follows the contours of the surface to be marked and any irregularities in the surface give rise to inaccuracies in measurement. On the other hand, a tape has to be anchored at one end and recovered one the required distance has been determined. In addition, neither a trundle wheel nor a tape measure is an integral part of a line marking apparatus and cannot therefore be used in combination with the apparatus to result in a synergistic combination.

It is therefore an object of the present invention to provide a line marking apparatus incorporating distance measurement which overcomes, or at least ameliorates the above-described disadvantages.

According to the present invention there is provided a line marking apparatus comprising a body mounted so as to be mobile, a line marking head movable relative to the body, and means for determining the distance travelled by the apparatus from a determined point.

The means for determining distance may determine the distance moved by the line marking head from the determined point.

The apparatus may include a display for displaying distance travelled.

The apparatus may include a position sensor for use in determining the distance travelled.

The apparatus may additionally determine the amount of line marking material used from the determined point.

Distance measurement may be used to turn the flow of line marking material to the line marking head on and/or off.

At certain determined distance measurements the line marking head may be automatically adjusted to adjust the width of a line being marked.

The apparatus may additionally include means for determining data relating to distance against time.

The apparatus may provide real-time data on the use of line-marking material compared with distance travelled. The apparatus may employ distance and time measurements together with one or more of concentration of line marking material and flow rate of line marking material to determine optimum settings for operation of the apparatus for any particular line width. In particular, the optimum settings for any particular line width may relate the speed of the apparatus to the flow rate of line marking material or vice versa.

Figure 2:
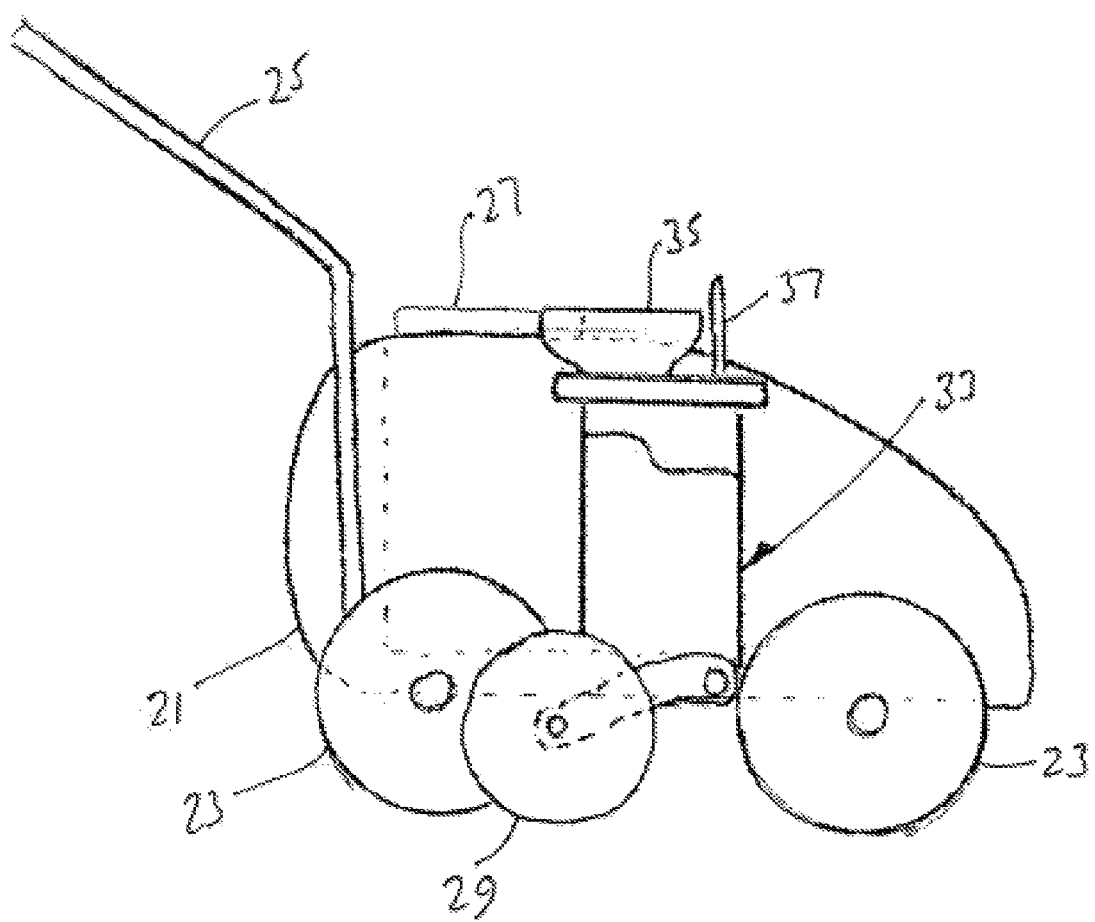

For a better understanding of the present invention and to show more clearly how it may be carried into effect reference will now be made, by way of example, to the accompanying drawings in which:

FIG. 1 is a diagrammatic front elevation of one embodiment of an apparatus in accordance with the present invention; and FIG. 2 is a side elevational view of the apparatus shown in FIG. 1.

FIGS. 1 and 2 diagrammatically illustrate one embodiment a line marking apparatus in accordance with the present invention. The apparatus comprises a body 21, which forms a chassis, provided with four wheels 23 and a handle 25 to enable a user to propel the apparatus. The body 21 is also provided with a reservoir for line marking material and having a removable cover 27. Line marking material is supplied to a line marking head 29 by way of a pump 31. The line marking head 29 is mounted on a lateral adjustment device 33 (such as that described in WO2006013386), as is a GNSS sensor 35 such that the sensor moves laterally with the line marking head. The GNSS sensor 35 is connected to a radio transceiver 37 which communicates with a stationary base station 39 which in turn incorporates a GNSS sensor 41 and a radio transceiver 43, together with a suitable power supply 45. The combination of the two GNSS devices 35 and 41 together with the two radio transceivers 37 and 43 provides a differential GPS system which in itself is well known to the skilled person.

The GNSS sensor 35 provided on the body 21 of the apparatus is connected to a network hub 47, as are the radio transceiver 37, the pump 31, and a motor 49 for controlling lateral movement of the line marking head 29 by way of the lateral adjustment device 33. A computer 51 and display 53 are also connected to the network hub 47, the display 53 showing various control and setup options as well as information relating to the line to be marked, such as distance and direction. An aerial 55 provides communication with a remote database (not shown) and permits, for example, the purchase of credit for use of the apparatus.

The apparatus shown in FIGS. 1 and 2 is used by selecting one or more lines to be marked. If desired, the computer 51 and display 53 (and optionally the apparatus itself) can be used to determine and save one or more lines to be marked together with at least one geographical datum point for the location of the lines.

In order to mark a line, the line may be downloaded to the computer 51 from the remote database and any required payment may be made. Alternatively, the location and direction of the line may be determined locally. The use of the apparatus may be logged and data returned to the remote database, for example either on completion of the task or at a later time when a suitable connection to the remote database is possible. The GNSS sensors 35 and 41 determine the location of the line marking head and guide the user to a starting location by way of the computer 51 and display 53. When marking a line, the lateral adjustment device 33 corrects for minor lateral errors in the position of the apparatus by moving the line marking head 29 laterally, such as to the right or to the left of a central position marker, but additionally or alternatively the display can indicate to the user whether movement to the left or right is required. The use of a central position marker, particularly in combination of further graduations indication the extent of movement of the line marking head from the central position marker, allows a user to redirect the line marking apparatus so as to bring the apparatus to a direction and location at which the line marking head returns towards the central position marker. The pump 31 is operated under control of the computer 51 and is turned on when a line is to be marked and off, if necessary, between marking different portions of the line. The display may indicate to the user the manner in which a line is to be marked, for example the direction in which a line is to be marked. The computer 51 advises the user, by way of the display 53, when the line has been completed.

Clearly, as an alternative to the manually propelled apparatus of FIGS. 1 and 2, the apparatus could be controlled automatically, for example by way of the computer 51. Further, alternative positioning systems can be used to provide the position fixes, including and inertial measurement unit (IMU), a laser-based system, compass or the like.

In addition to displaying details of a line to be marked, the display 53 can be used to display the distance, as determined by the computer 51 using the sensors 35 and 41, for which a line has been marked, either from the beginning of marking the line or from a determined position along that line, whether the line is straight or curved. Alternatively or additionally, the straight line distance between two determined points may be displayed. The computer 51 can also use the distance information for other purposes, the results of which may be shown on the display 53 if desired.

For example, in addition to distance, the computer 51 may, in combination with a meter (not shown) for determining the rate of flow of line marking material, determine the amount of line marking material used from a determined point. This is useful for cost control purposes and also for determining when the apparatus requires to be recharged with line marking material. Distance measurement may be used to turn the flow of line marking material to the line marking head on and/or off. That is, the flow of line marking material to the line marking head can be determined by the distance measurement. Alternatively or additionally, at certain determined distance measurements the line marking head can be automatically adjusted to adjust the width of a line being marked. Similarly, when marking a dashed line, the distance measurement can be used to activate and deactivate the flow of line marking material to the line marking head in order to mark the dashes and not the gaps between the dashes, respectively. This permits accurate marking of a dashed line without the need for a preliminary marking out of the area to be marked. Additionally or alternatively, distance measurement permits gathering of data relating to distance against time, that is speed, which allows a user to monitor his work. Such data can also be analysed by the user's manager and used to improve efficiency of marking.

More particularly, certain sports areas, athletics tracks and the like require intersection of lines at certain points. These include the half-way line on a soccer pitch, the yard lines on an American football pitch, the positions of start and finish lines, hurdles and baton exchange boxes on an athletics track and the like. Such points can be indicated when marking a boundary or similar line, for example by briefly increasing the width of the line being marked.

Measurement of distance allows real-time feedback on the use of line-marking material for any particular line width compared with distance travelled. A slow rate of travel uses more line marking material than is desirable because the amount of line marking material dispensed for each meter travelled is more than is required for an optimal line, while a fast rate of travel may use too little line marking material, with the result that insufficient line marking material is used for an optimal line. Measurement of distance can therefore be used to indicate to the user that he needs to move more quickly. Alternatively, for any particular line width, the flow rate of line marking material should be monitored and decreased, for example by reducing the concentration of the line marking material, by reducing the pumping rate of the line marking material, by recirculating part of the line marking material to a holding tank, or by reducing the nozzle size of the spray nozzle employed. Alternatively, the user may need to move more slowly or the flow rate of line marking material should be increased. Information relating to distance and time for any particular line width, together with at least one of concentration of line marking material and flow rate of line marking material may be used to determine optimum settings for operation of the apparatus, for example as a table informing the user for any particular line width of the optimum settings for the distance and time measurements he achieves, or for directly controlling the speed of the apparatus in relation to the rate of use and/or concentration of line marking material. In particular, the optimum settings for any particular line width may relate the speed of the apparatus to the flow rate of line marking material or vice versa.

I claim:

1. A line marking apparatus comprising:
   a. a body mounted so as to be mobile;
   b. a line-marking head movable relative to the body so as to, when marking a straight line, maintain a correct lateral position of the line-marking head for marking the straight line during lateral deviation movements of the body;
   c. a geographic position sensor adapted to determine geographic location coordinates of the apparatus; and
   d. distance-determining means adapted to, when marking a straight line, determine the distance traveled along the straight line by the apparatus from a determined point during said lateral deviation movements of the body, the distance-determining means being adapted to use the geographic position location coordinates from the geographic position sensor to determine the distance traveled by the apparatus.

2. The apparatus of claim 1, wherein the geographic position sensor is configured to detect geographic location coordinates of the line-marking head, and wherein the distance-determining means is adapted to determine the distance traveled by the line-marking head from the determined point.

3. The apparatus of claim 1, further comprising a display adapted to display the distance determined by the distance-determining means.

4. The apparatus of claim 1, further comprising means for determining an amount of line-marking material used over the distance traveled from the determined point.

5. The apparatus of claim 1, wherein the distance-determining means is adapted to turn a flow of line marking material to the line-marking head on and/or off depending on the determined distance traveled.

6. The apparatus of claim 1, further comprising means for adjusting the line-marking head to adjust the width of a line being marked at predetermined distance measurements.

7. The apparatus of claim 1, further comprising means for determining data relating to distance against time.

8. The apparatus of claim 1, further comprising means for providing real-time data on the use of the line-marking material compared with distance traveled.

9. The apparatus of claim 1, further comprising means for determining settings for operation of the apparatus for any particular line width based on distance and time measurements together with one or more of concentration of line-marking material and flow rate of line-marking material.

10. The apparatus of claim 9, further comprising means for relating the speed of the apparatus to the flow rate of line-marking material, or vice versa, for any particular line width.

11. The apparatus of claim 1, further comprising wireless communication means adapted to transmit the distance traveled to a remote database.

12. The apparatus of claim 1, further comprising wireless communication means adapted to receive line definition information of a line to be marked from a remote database.

13. The apparatus of claim 1, wherein the geographic position sensor comprises a GPS receiver.

14. The apparatus of claim 1, wherein the geographic position sensor comprises a laser-based system.

15. The apparatus of claim 1, wherein the geographic position sensor comprises an inertial measurement unit.

16. The apparatus of claim 1, wherein the distance-determining means is adapted to determine a straight-line distance of the apparatus from the determined point.

17. The apparatus of claim 1, wherein the distance-determining means is adapted to determine the distance traveled by the apparatus, along a line marked by the apparatus, from the determined point.

18. The apparatus of claim 1, further comprising a computer and display adapted to, on the basis of the geographic location coordinates, determine the location of the line marking head and guide the user to a starting location of a line to be marked.

* * * * *